US012775814B2

(12) United States Patent
Faaborg et al.

(10) Patent No.: US 12,775,814 B2
(45) Date of Patent: Oct. 27, 2026

(54) TECHNIQUES FOR GESTURE-BASED ENCODED INFORMATION RECOGNITION IN ARTIFICIAL REALITY ENVIRONMENTS, AND METHODS AND SYSTEMS THEREOF

(71) Applicant: Meta Platforms Technologies, LLC, Menlo Park, CA (US)

(72) Inventors: Alexander Faaborg, Mountain View, CA (US); Joseph Gardner, Burlingame, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/605,162

(22) Filed: Mar. 14, 2024

(65) Prior Publication Data

US 2024/0220752 A1 Jul. 4, 2024

Related U.S. Application Data

(60) Provisional application No. 63/499,363, filed on May 1, 2023, provisional application No. 63/499,356, filed on May 1, 2023.

(51) Int. Cl.

| | |
|---|---|
| ***G06K 7/14*** | (2006.01) |
| ***G06F 3/01*** | (2006.01) |
| ***G06V 20/20*** | (2022.01) |
| ***G06V 30/224*** | (2022.01) |
| ***G06V 40/16*** | (2022.01) |

(52) U.S. Cl.

CPC ............ *G06K 7/1417* (2013.01); *G06F 3/011* (2013.01); *G06F 3/017* (2013.01); *G06V 20/20* (2022.01); *G06V 30/224* (2022.01); *G06V 40/172* (2022.01)

(58) Field of Classification Search

CPC .......................... G06K 7/1417; G06V 7/1417
USPC .................................................... 235/462.09
See application file for complete search history.

(56) References Cited

U.S. PATENT DOCUMENTS

| | | | |
|---|---|---|---|
| 5,107,443 | A | 4/1992 | Smith et al. |
| 5,600,765 | A | 2/1997 | Ando et al. |
| 6,563,498 | B1 | 5/2003 | Hirata et al. |

(Continued)

FOREIGN PATENT DOCUMENTS

| | | | |
|---|---|---|---|
| CN | 102084354 | A | 6/2011 |
| CN | 102695032 | A | 9/2012 |

(Continued)

OTHER PUBLICATIONS

Argelaguet F., et aL, A Survey of 3D Object Selection Techniques for Virtual Environments, Computers & Graphics,2013, vol. 37, No. 3, pp. 121-136.

(Continued)

*Primary Examiner* — Allyson N Trail
(74) *Attorney, Agent, or Firm* — Morgan, Lewis & Bockius LLP

(57) ABSTRACT

In some implementations, the disclosed systems and methods can be in sleep mode as its user traverses the real-world environment and can awaken upon a trigger, such as the wrist being raised (as detected, for example, by cameras or sensors on a smart wristband in communication with the XR device). In some implementations, the disclosed systems and methods can capture images of a user wearing the device while looking in the mirror.

20 Claims, 10 Drawing Sheets

(56) References Cited

U.S. PATENT DOCUMENTS 6,784,901 B1 8/2004 Harvey et al.
6,842,175 B1 1/2005 Schmalstieg et al.
7,119,819 B1 10/2006 Robertson et al.
7,231,609 B2 6/2007 Baudisch
7,701,439 B2 4/2010 Hillis et al.
7,971,157 B2 6/2011 Markovic et al.
8,402,391 B1 3/2013 Doray et al.
8,558,759 B1 10/2013 Prada Gomez et al.
8,788,952 B2 7/2014 Hamilton, II et al.
8,836,768 B1 9/2014 Rafii et al.
8,884,876 B2 11/2014 Song et al.
8,913,056 B2 12/2014 Zimmer et al.
8,947,351 B1 2/2015 Noble
9,117,274 B2 8/2015 Liao et al.
9,292,089 B1 3/2016 Sadek
9,323,422 B2 4/2016 Song et al.
9,477,303 B2 10/2016 Fleischmann et al.
9,477,368 B1 10/2016 Filip et al.
9,659,413 B2 5/2017 Grossinger et al.
9,749,367 B1 8/2017 Kirby et al.
9,817,472 B2 11/2017 Lee et al.
9,865,260 B1 1/2018 Vuskovic et al.
9,983,687 B1 5/2018 Forsblom et al.
9,992,451 B2 6/2018 Ono et al.
10,019,843 B2 7/2018 Grossinger et al.
10,042,430 B2 8/2018 Bedikian et al.
10,168,789 B1 1/2019 Soto et al.
10,220,303 B1 3/2019 Schmidt et al.
10,248,284 B2 4/2019 Itani et al.
10,248,301 B2 4/2019 Stachniak et al.
10,261,595 B1 4/2019 Kin
10,281,976 B2 5/2019 Nishizawa et al.
10,353,532 B1 7/2019 Holz et al.
10,402,081 B1 9/2019 Andersen et al.
10,473,935 B1 11/2019 Gribetz et al.
10,489,978 B2 11/2019 Dimitrov et al.
10,503,349 B2 12/2019 Alexander
10,521,944 B2 12/2019 Sareen et al.
10,595,011 B2 3/2020 Han et al.
10,691,205 B1 6/2020 Schick
10,930,075 B2 2/2021 Costa et al.
10,936,080 B2 3/2021 Marcolina et al.
10,937,215 B1 3/2021 Iskandar
11,113,891 B2 9/2021 Noris et al.
11,150,730 B1 10/2021 Anderson et al.
11,194,438 B2 12/2021 Boesel et al.
11,216,152 B2 1/2022 Alexander
11,221,730 B2 1/2022 Murphy et al.
11,307,671 B2 4/2022 Liu et al.
11,334,212 B2 5/2022 Ravasz et al.
11,366,319 B1 6/2022 Douglas et al.
11,514,650 B2 11/2022 Kim et al.
11,556,183 B1 1/2023 Li et al.
12,001,419 B1 * 6/2024 Khoyilar ............... G06F 16/219
12,436,620 B2 10/2025 Reisman et al.
2003/0224854 A1 12/2003 Joao
2004/0150664 A1 8/2004 Baudisch
2004/0261013 A1 12/2004 Wynn et al.
2004/0266505 A1 12/2004 Keam et al.
2005/0018216 A1 1/2005 Barsness et al.
2006/0146765 A1 7/2006 Van De Sluis et al.
2007/0250787 A1 10/2007 Kawahara et al.
2008/0012865 A1 1/2008 Forbes
2008/0059904 A1 3/2008 Abbey et al.
2008/0089587 A1 4/2008 Kim et al.
2008/0174550 A1 7/2008 Laurila et al.
2009/0077504 A1 3/2009 Bell et al.
2009/0300639 A1 12/2009 Hamilton, II et al.
2009/0319929 A1 12/2009 Wang et al.
2010/0031203 A1 2/2010 Morris et al.
2010/0103101 A1 4/2010 Song et al.
2010/0103167 A1 4/2010 Song et al.
2010/0103178 A1 4/2010 Song et al.
2010/0125815 A1 5/2010 Wang et al.
2010/0156892 A1 6/2010 Chan, II et al.
2010/0306716 A1 12/2010 Perez
2011/0022393 A1 1/2011 Wäller et al.
2011/0164029 A1 7/2011 King et al.
2011/0169927 A1 7/2011 Mages et al.
2011/0228078 A1 9/2011 Chen et al.
2011/0239155 A1 9/2011 Christie
2011/0249024 A1 10/2011 Arrasvuori et al.
2011/0267265 A1 11/2011 Stinson
2012/0030624 A1 2/2012 Migos
2012/0069168 A1 3/2012 Huang et al.
2012/0071892 A1 3/2012 Itkowitz et al.
2012/0096397 A1 4/2012 Ording et al.
2012/0113223 A1 5/2012 Hilliges et al.
2012/0131495 A1 5/2012 Goossens et al.
2012/0143358 A1 6/2012 Adams et al.
2012/0188279 A1 7/2012 Demaine
2012/0206345 A1 8/2012 Langridge
2012/0210254 A1 8/2012 Fukuchi et al.
2012/0218183 A1 8/2012 Givon et al.
2012/0218395 A1 8/2012 Andersen et al.
2012/0249740 A1 10/2012 Lee et al.
2012/0249741 A1 10/2012 Maciocci et al.
2012/0275686 A1 11/2012 Wilson et al.
2012/0293544 A1 11/2012 Miyamoto et al.
2013/0057642 A1 3/2013 Catchpole
2013/0063345 A1 3/2013 Maeda
2013/0069985 A1 3/2013 Wong et al.
2013/0093751 A1 4/2013 Stachniak et al.
2013/0125066 A1 5/2013 Klein et al.
2013/0147793 A1 6/2013 Jeon et al.
2013/0174101 A1 7/2013 Han et al.
2013/0182902 A1 7/2013 Holz
2013/0208135 A1 8/2013 Han et al.
2013/0265220 A1 10/2013 Fleischmann et al.
2013/0278501 A1 10/2013 Bulzacki
2013/0283213 A1 10/2013 Guendelman et al.
2013/0339142 A1 12/2013 Hewinson
2014/0007484 A1 1/2014 Erdoss et al.
2014/0009407 A1 1/2014 Kim
2014/0028567 A1 1/2014 Park et al.
2014/0028716 A1 1/2014 Yeh
2014/0040815 A1 2/2014 Goossens et al.
2014/0062854 A1 3/2014 Cho
2014/0104206 A1 4/2014 Anderson
2014/0125598 A1 5/2014 Cheng et al.
2014/0152623 A1 6/2014 Lee et al.
2014/0189737 A1 7/2014 Jang et al.
2014/0201145 A1 7/2014 Dorman et al.
2014/0204002 A1 7/2014 Bennet et al.
2014/0210797 A1 7/2014 Kreek et al.
2014/0232637 A1 8/2014 Park et al.
2014/0236996 A1 8/2014 Masuko et al.
2014/0267078 A1 9/2014 Kukulski et al.
2014/0279242 A1 9/2014 Staicut et al.
2014/0282274 A1 9/2014 Everitt et al.
2014/0282275 A1 9/2014 Everitt et al.
2014/0306891 A1 10/2014 Latta et al.
2014/0320408 A1 10/2014 Zagorsek et al.
2014/0344922 A1 11/2014 Lam et al.
2014/0357366 A1 12/2014 Koganezawa et al.
2014/0361988 A1 12/2014 Katz et al.
2014/0375691 A1 12/2014 Kasahara
2015/0029120 A1 1/2015 Sieckmann
2015/0035746 A1 2/2015 Cockburn et al.
2015/0040040 A1 2/2015 Balan et al.
2015/0054742 A1 2/2015 Imoto et al.
2015/0062160 A1 3/2015 Sakamoto et al.
2015/0070332 A1 3/2015 Lee et al.
2015/0106767 A1 4/2015 Abercrombie et al.
2015/0110285 A1 4/2015 Censo et al.
2015/0149929 A1 5/2015 Shepherd et al.
2015/0153833 A1 6/2015 Pinault et al.
2015/0160736 A1 6/2015 Fujiwara
2015/0169076 A1 6/2015 Cohen et al.
2015/0181679 A1 6/2015 Liao et al.
2015/0206321 A1 7/2015 Scavezze et al.
2015/0220150 A1 8/2015 Plagemann et al.
2015/0243100 A1 8/2015 Abovitz et al.
2015/0261318 A1 9/2015 Scavezze et al.

(56) References Cited

U.S. PATENT DOCUMENTS

2015/0261659 A1 9/2015 Bader et al.
2015/0269783 A1 9/2015 Yun
2015/0331576 A1 11/2015 Piya et al.
2015/0358088 A1 12/2015 Eim et al.
2016/0054851 A1 2/2016 Kim et al.
2016/0110052 A1 4/2016 Kim et al.
2016/0147308 A1 5/2016 Gelman et al.
2016/0170603 A1 6/2016 Bastien et al.
2016/0231833 A1 8/2016 Gu et al.
2016/0292217 A1 10/2016 Sinha et al.
2016/0306431 A1 10/2016 Stafford et al.
2016/0320853 A1 11/2016 Lien et al.
2016/0370971 A1 12/2016 Hackett et al.
2016/0378291 A1 12/2016 Pokrzywka
2017/0050542 A1 2/2017 Shigeta et al.
2017/0060230 A1 3/2017 Faaborg et al.
2017/0061600 A1 3/2017 Cole et al.
2017/0097141 A1 4/2017 Hyodo et al.
2017/0099295 A1 4/2017 Ricci
2017/0109936 A1 4/2017 Powderly et al.
2017/0139478 A1 5/2017 Jeon et al.
2017/0168566 A1 6/2017 Osterhout et al.
2017/0192513 A1 7/2017 Karmon et al.
2017/0220119 A1 8/2017 Potts et al.
2017/0228130 A1 8/2017 Palmaro
2017/0236492 A1 8/2017 Taki et al.
2017/0255786 A1 9/2017 Krishnamurthi
2017/0262063 A1 9/2017 Blénessy et al.
2017/0263056 A1 9/2017 Leppanen et al.
2017/0278304 A1 9/2017 Hildreth et al.
2017/0287225 A1 10/2017 Powderly et al.
2017/0296363 A1 10/2017 Yetkin et al.
2017/0308118 A1 10/2017 Ito
2017/0308165 A1 10/2017 Erivantcev et al.
2017/0324935 A1 11/2017 Brooks et al.
2017/0329419 A1 11/2017 Dearman et al.
2017/0329488 A1 11/2017 Welker et al.
2017/0337742 A1 11/2017 Powderly et al.
2017/0344220 A1 11/2017 Cook et al.
2017/0364198 A1 12/2017 Yoganandan et al.
2018/0004283 A1 1/2018 Mathey-Owens et al.
2018/0033204 A1 2/2018 Dimitrov et al.
2018/0046245 A1 2/2018 Schwarz et al.
2018/0059901 A1 3/2018 Gullicksen
2018/0081456 A1 3/2018 Li et al.
2018/0088677 A1 3/2018 Zhang et al.
2018/0089349 A1 3/2018 Rezgui
2018/0101237 A1 4/2018 Lu
2018/0107278 A1 4/2018 Goel et al.
2018/0113599 A1 4/2018 Yin
2018/0136898 A1 5/2018 Shi et al.
2018/0181245 A1 6/2018 Beck et al.
2018/0303446 A1 10/2018 Schweizer
2018/0307303 A1 10/2018 Powderly et al.
2018/0322701 A1 11/2018 Pahud et al.
2018/0323992 A1 11/2018 Harms et al.
2018/0329492 A1 11/2018 Coppin et al.
2018/0335925 A1 11/2018 Hsiao et al.
2018/0343023 A1 11/2018 Park et al.
2018/0357780 A1 12/2018 Young et al.
2018/0364808 A1 12/2018 Pahud et al.
2019/0050062 A1 2/2019 Chen et al.
2019/0050071 A1 2/2019 Liu et al.
2019/0057531 A1 2/2019 Sareen et al.
2019/0065026 A1 2/2019 Kiemele et al.
2019/0094981 A1 3/2019 Bradski et al.
2019/0102043 A1 4/2019 Lee
2019/0107894 A1 4/2019 Hebbalaguppe et al.
2019/0114835 A1 4/2019 Costa et al.
2019/0120593 A1 4/2019 Randles
2019/0129607 A1 5/2019 Saurabh et al.
2019/0130653 A1 5/2019 Kuehne
2019/0143204 A1 5/2019 Aman et al.
2019/0163266 A1 5/2019 Johnson et al.
2019/0212827 A1 7/2019 Kin et al.
2019/0213792 A1 7/2019 Jakubzak et al.
2019/0258318 A1 8/2019 Qin et al.
2019/0278376 A1 9/2019 Kutliroff et al.
2019/0279424 A1 9/2019 Clausen et al.
2019/0286231 A1 9/2019 Burns et al.
2019/0340833 A1 11/2019 Furtwangler et al.
2019/0347865 A1 11/2019 Hackett et al.
2019/0361521 A1 11/2019 Stellmach et al.
2019/0362557 A1 11/2019 Lacey et al.
2019/0362562 A1 11/2019 Benson
2019/0369391 A1 12/2019 Cordesses et al.
2019/0369752 A1 12/2019 Ikeda et al.
2019/0377416 A1 12/2019 Alexander
2019/0392729 A1 12/2019 Lee et al.
2020/0012341 A1 1/2020 Stellmach et al.
2020/0042111 A1 2/2020 Connellan et al.
2020/0082629 A1 3/2020 Jones et al.
2020/0093200 A1 3/2020 Mohapatra et al.
2020/0097077 A1 3/2020 Nguyen et al.
2020/0097091 A1 3/2020 Chou et al.
2020/0103980 A1 4/2020 Katz et al.
2020/0125176 A1 4/2020 Chou et al.
2020/0129850 A1 4/2020 Ohashi
2020/0207358 A1 7/2020 Katz et al.
2020/0218423 A1 7/2020 Ohashi
2020/0221019 A1 7/2020 Jang et al.
2020/0225736 A1 7/2020 Schwarz et al.
2020/0225758 A1 7/2020 Tang et al.
2020/0225830 A1 7/2020 Tang et al.
2020/0226814 A1 7/2020 Tang et al.
2020/0371666 A1 11/2020 Ni et al.
2020/0379576 A1 12/2020 Chen et al.
2020/0387287 A1 12/2020 Ravasz et al.
2021/0056750 A1 2/2021 Rowley
2021/0076080 A1 3/2021 Yoo et al.
2021/0076091 A1 3/2021 Shohara
2021/0096726 A1 4/2021 Faulkner et al.
2021/0181863 A1 6/2021 Gatson et al.
2021/0373672 A1 12/2021 Schwarz et al.
2021/0390781 A1 12/2021 Charlton et al.
2022/0083197 A1 3/2022 Rockel et al.
2022/0121288 A1* 4/2022 Wu ....................... G06F 3/0346
2022/0203996 A1 6/2022 Katz
2022/0214743 A1 7/2022 Dascola et al.
2022/0244834 A1 8/2022 Ravasz et al.
2022/0291755 A1 9/2022 Lu et al.
2022/0392172 A1* 12/2022 Focke .................. G06V 10/225
2023/0040610 A1 2/2023 Buerli et al.
2023/0082789 A1 3/2023 Lu et al.
2023/0093979 A1 3/2023 Stauber et al.
2023/0100689 A1 3/2023 Chiu et al.
2023/0252737 A1 8/2023 Dreyer et al.
2023/0274512 A1 8/2023 Terre et al.
2023/0306695 A1 9/2023 Rockel et al.
2023/0336593 A1* 10/2023 Steptoe ................... G06T 11/00
2023/0368620 A1* 11/2023 Brown .................. G07F 17/323
2024/0112415 A1* 4/2024 Tinklepaugh ...... G06Q 30/0645
2024/0153220 A1* 5/2024 Focke ..................... G06T 11/00
2024/0168542 A1 5/2024 Klein et al.
2024/0220752 A1* 7/2024 Faaborg ............... G06V 30/224
2024/0256032 A1 8/2024 Holder et al.
2024/0289013 A1 8/2024 Shen
2024/0385692 A1 11/2024 Shutzberg et al.
2024/0402800 A1 12/2024 Shutzberg et al.
2025/0078577 A1 3/2025 Bedri et al.
2025/0103141 A1 3/2025 Bae et al.
2025/0123691 A1* 4/2025 Edelson .................. G06F 3/167
2025/0148728 A1* 5/2025 Randles ................ G06T 19/006
2025/0159301 A1* 5/2025 Palaganas .......... H04N 21/2402
2025/0170475 A1* 5/2025 Jilani ...................... A63F 13/61
2025/0217818 A1* 7/2025 Woerner ............. G06F 16/2246

FOREIGN PATENT DOCUMENTS

EP 3155560 A1 4/2017
EP 3155560 B1 5/2020
EP 4145397 A1 3/2023
EP 4471559 A1 12/2024
JP H02197946 A 8/1990

(56) References Cited

FOREIGN PATENT DOCUMENTS

| | | | |
|---|---|---|---|
| JP | 2012168646 | A | 9/2012 |
| JP | 2014518596 | A | 7/2014 |
| JP | 2015511043 | A | 4/2015 |
| JP | 2015100032 | A | 5/2015 |
| JP | 2016045623 | A | 4/2016 |
| JP | 2018516399 | A | 6/2018 |
| KR | 20120136719 | A | 12/2012 |
| TW | 201405411 | A | 2/2014 |
| TW | 201814438 | A | 4/2018 |
| WO | 2011029986 | A1 | 3/2011 |
| WO | 2012092025 | A2 | 7/2012 |
| WO | 2015125375 | A1 | 8/2015 |
| WO | 2017009707 | A1 | 1/2017 |
| WO | 2018198910 | A1 | 11/2018 |
| WO | 2018235371 | A1 | 12/2018 |
| WO | 2019245681 | A1 | 12/2019 |

OTHER PUBLICATIONS

Billinghurst M., et al., "Hands In Space Gesture Interaction with Augmented-Reality Interfaces," IEEE Computer Graphics and Applications, Jan. 2014, vol. 34, No. 01, 5 pages.

Cardoso J., 'Comparison of Gesture, Gamepad, and Gaze-Based Locomotion for VR Worlds, Proceedings of the 22nd ACM Conference on Virtual Reality Software and Technology, Nov. 2, 2016, pp. 319-320.

Co-Pending U.S. Appl. No. 16/435,110, filed Jun. 7, 2019, 75 Pages.

Co-Pending U.S. Appl. No. 17/812,362, filed Jul. 13, 2022, 91 pages.

European Search Report for European Patent Application No. 23155919.6, dated Jun. 13, 2023, 6 pages.

Fox B., et al., "Designing Singlehanded Shortcuts for VR & AR," May 10, 2018, Retrieved from the Internet: URL: https://www.roadtovr.com/leap-motion-designing-single-handed-shortcuts-for-vr-ar/, [Retrieved on Oct. 27, 2020], 18 pages.

Hincapie-Ramos J.D., et aL, "GyroWand: IMU-Based Raycasting for Augmented Reality Head-Mounted Displays," Proceedings of the 3rd Association for Computing Machinery (ACM) Symposium on Spatial User Interaction, Los Angeles, Ca, USA, Aug. 8-9, 2015, pp. 89-98.

Huang Y., et al., "Evaluation of a Hybrid of Hand Gesture and Controller Inputs in Virtual Reality," International Journal of Human-Computer Interaction, Aug. 26, 2020, vol. 37, No. 2, pp. 169-180.

International Preliminary Report on Patentability for International Application No. PCT/US2020/051763, mailed Mar. 31, 2022, 10 pages.

International Preliminary Report on Patentability for International Application No. PCT/US2023/017990, mailed Oct. 17, 2024, 8 pages.

International Search Report and Written Opinion for International Application No. PCT/US2020/035384, mailed Sep. 7, 2020, 10 Pages.

International Search Report and Written Opinion for International Application No. PCT/US2020/051763, mailed Feb. 3, 2021, 11 Pages.

International Search Report and Written Opinion for International Application No. PCT/US2021/063536 mailed Mar. 22, 2022, 12 pages.

International Search Report and Written Opinion for International Application No. PCT/US2022/036051 mailed Oct. 10, 2022, 11 pages.

International Search Report and Written Opinion for International Application No. PCT/US2023/017990, mailed Jul. 10, 2023, 9 pages.

International Search Report and Written Opinion of International Application No. PCT/US2020/035998, mailed Sep. 30, 2020, 16 pages.

Kim H., et al., "Swag Demo Smartwatch Assisted Gesture Interaction for Mixed Reality Head-Mounted Displays," 2018 IEEE International Symposium on Mixed and Augmented Reality, ISMAR—Adjunct 2018, Oct. 16, 2018, pp. 428-429.

Lang B., "Leap Motion Virtual Wearable AR Prototype is a Potent Glimpse at the Future of Your Smartphone," Mar. 24, 2018, Retrieved from the Internet: URL: https://www.roadtovr.com/leap-motion-virtual-wearable-ar-prototype- glimpse-of-future-smartphone/, [Retrieved on Oct. 27, 2020], 6 pages.

Lee M.S., et al., "A Computer Vision System for on-Screen Item Selection by Finger Pointing," In Proceedings of the 2001 IEEE Computer Society Conference on Computer Vision and Pattern Recognition (CVPR), 2001, vol. 1, 8 pages.

Mardanbegi D., et al., "Eyesee Through: Unifying Tool Selection and Application in Virtual Environments," In 2019 IEEE Conference on Virtual Reality and 3D User Interfaces (VR), 2019, pp. 474-483.

Matsuda K., "Augmented City 3D [Official]," YouTube, Aug. 20, 2010, Retrieved from the Internet: URL: https://www.youtube.com/watch?v=3TL80ScTLIM, 1 page.

Mayer S., et aL, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Mine M.R., et al., Moving Objects in Space: Exploiting Proprioception in Virtual-Environment Interaction, In Proceedings of the 24th Annual Conference on Computer Graphics and Interactive Techniques, 1997, pp. 19-26.

Newton A., "Immersive Menus Demo," YouTube, Oct. 8, 2017, Retrieved from the Internet: URL: https://www.youtube.com/watch?v=_ow1RboHJDY, 1 page.

Notice of Allowance mailed Apr. 13, 2022 for U.S. Appl. No. 16/435,110, filed Jun. 7, 2019, 10 pages.

Office Action mailed Sep. 6, 2023 for Taiwan Application No. 109118112, filed May 29, 2020, 9 pages.

Office Action mailed Sep. 17, 2024 for Japanese Patent Application No. 2021-557668, filed on May 29, 2020, 3 pages.

Office Action mailed Sep. 19, 2023 for European Patent Application No. 20747255.6, filed on Dec. 7, 2021, 6 pages.

Office Action mailed Feb. 20, 2024 for Japanese Patent Application No. 2021-557668, filed on May 29, 2020, 4 pages.

Office Action mailed Oct. 20, 2023 for Chinese Application No. 202080039024.1, filed May 29, 2020, 15 pages.

Office Action mailed Sep. 20, 2023 for European Patent Application No. 20746759.8, filed on May 29, 2020, 5 pages.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Pfeuffer, et al., "Gaze+ Pinch Interaction in Virtual Reality," Proceedings of the 5th Symposium on Spatial User Interaction, SUI '17, Oct. 16, 2017, pp. 99-108.

Prosecution History from U.S. Appl. No. 16/435,110, dated Apr. 17, 2020 through Apr. 13, 2022, 212 pp.

Prosecution History from U.S. Appl. No. 16/435,116, dated Feb. 7, 2022 through Apr. 19, 2022, 156 pp.

Prosecution History of U.S. Appl. No. 16/434,919, dated Apr. 2, 2020 through Dec. 15, 2020, 46 pages.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et aL, "EyePointing: A Gaze-Based Selection Technique," Proceedings of Mensch and Computer, Hamburg, Germany, Sep. 8-11, 2019, pp. 719-723.

Tomberlin M., et al., "Gauntlet: Travel Technique for Immersive Environments using Non-Dominant Hand," IEEE Virtual Reality (VR), Mar. 18, 2017, pp. 299-300.

Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.

Clarke C., et al., "Enhanced Virtual Private Social Networks: Implementing User Content Confidentiality," IEEE Xplore, The 8th

(56) References Cited

OTHER PUBLICATIONS

International Conference for Internet Technology and Secured Transactions, Dec. 1, 2013, pp. 306-312.
Final Office Action mailed May 29, 2025 for U.S. Appl. No. 18/220,148, filed Jul. 10, 2023, 14 pages.
Ganesh D., et al., "Protection of Shared Data Among Multiple Users for Online Social Networks," IEEE Xplore, The 8th International Conference on Contemporary Computing and Informatics, Nov. 1, 2014, pp. 768-773.
Gau M., et al., "Responsive Open Space: Sound and Image in Public Spaces," 2012 18th International Conference on Virtual Systems and Multimedia, Sep. 2-5, 2012, pp. 541-544.
International Preliminary Report on Patentability for International Application No. PCT/US2016/055499, mailed Apr. 18, 2019, 7 Pages.
International Search Report and Written Opinion for International Application No. PCT/US2016/055499, mailed Jul. 5, 2017, 08 Pages.
Non-Final Office Action mailed Sep. 26, 2024 for U.S. Appl. No. 18/404,825, filed Jan. 4, 2024, 19 pages.
Notice of Reasons for Refusal mailed Sep. 1, 2020 for Japanese Application No. 2019-518037, filed Oct. 5, 2016, 8 Pages.
Notice of Reasons for Rejection mailed Mar. 16, 2021 for Japanese Application No. 2019-518037, filed Oct. 5, 2016, 6 Pages.
Notification of First Office Action mailed Jan. 5, 2022 for Chinese Application No. 201680091197.1, filed Oct. 5, 2016, 15 pages.
Office Action mailed Jun. 16, 2022 for Chinese Application No. 201680091197.1, filed Oct. 5, 2016, 13 pages.
Office Action mailed May 21, 2023 for Korean Application No. 10-2019-7012801, filed Oct. 5, 2016, 3 pages.
Office Action mailed Nov. 27, 2022 for Korean Application No. 10-2019-7012801, filed Oct. 5, 2016, 10 pages.
Pettifer S., et al., "A Collaborative Access Model for Shared Virtual Environments," Proceedings Tenth IEEE International Workshop on Enabling Technologies: Infrastructure for Collaborative Enterprises, Wet Ice 2001, Jun. 20-22, 2001, pp. 257-262.
Shiozawa H., et al., "Collaborative Workspace Visualization Using Background and Perspective," Transactions of Information Processing Society of Japan, Nov. 15, 1999, vol. 40 (11), pp. 3823-3833.

* cited by examiner

TECHNIQUES FOR GESTURE-BASED ENCODED INFORMATION RECOGNITION IN ARTIFICIAL REALITY ENVIRONMENTS, AND METHODS AND SYSTEMS THEREOF

CROSS REFERENCE TO RELATED APPLICATIONS

This application claims priority to U.S. Provisional Application No. 63/499,356, filed on May 1, 2023, titled "I Artificial Reality System for Code Recognition and Health Metrics," and U.S. Provisional Application No. 63/499,363, filed on May 1, 2023, titled "Facial Recognition-Triggered Display of Health Metrics on an Artificial Reality Device," both of which are incorporated herein by reference in their entirety.

BACKGROUND

Artificial reality (XR) devices are becoming more prevalent. As they become more popular, the applications implemented on such devices are becoming more sophisticated. Augmented reality (AR) applications can provide interactive 3D experiences that combine images of the real-world with virtual objects, while virtual reality (VR) applications can provide an entirely self-contained 3D computer environment. For example, an AR application can be used to superimpose virtual objects over a video feed of a real scene that is observed by a camera. A real-world user in the scene can then make gestures captured by the camera that can provide interactivity between the real-world user and the virtual objects. Mixed reality (MR) systems can allow light to enter a user's eye that is partially generated by a computing system and partially includes light reflected off objects in the real-world. AR, MR, and VR (together XR) experiences can be observed by a user through a head-mounted display (HMD), such as glasses or a headset. An MR HMD can have a pass-through display, which allows light from the real-world to pass through a waveguide that simultaneously emits light from a projector in the MR HMD, allowing the MR HMD to present virtual objects intermixed with real objects the user can actually see.

SUMMARY

Aspects of the present disclosure are directed to quick response (QR) code recognition on an artificial reality (XR) device. The XR device can be in sleep mode as its user traverses the real-world environment and can awaken upon a trigger, such as the wrist being raised (as detected, for example, by cameras or sensors on a smart wristband in communication with the XR device). The XR device can then recognize a particular gesture being performed in relation to a QR code (e.g., framing the QR code with an L-shape with one hand), read the QR code, and open the content associated with the QR code.

Further aspects of the present disclosure are directed to triggering display of health metrics on an artificial reality (XR) device based on facial recognition. External facing cameras on the XR device can capture images of a user wearing the device while looking in the mirror. The XR device can perform facial recognition to determine that the user's face is being reflected in the mirror. The XR device can then add metrics, such as health metrics, around the view of the user's face. For example, a user can look at herself in the bathroom mirror, and see her sleep score. Thus, the user does not have to explicitly launch the metrics on the XR device, and the XR device can surface the metrics seamlessly throughout the day to keep the user apprised of her health.

DESCRIPTION

Aspects of the present disclosure are directed to quick response (QR) code recognition on an artificial reality (XR) device. As a user walks around her real-world environment wearing her XR device, the XR device can remain in a standby mode, conserving battery power. The XR device can detect a wakeup trigger, such as a user making a particular gesture such as raising her hand above a threshold or speaking a phrase, etc. In some cases, the wakeup trigger can be detected via cameras or other sensors in an HMD or via a wearable device (e.g., a smart wristband in communication with the XR device). The XR device can then detect (e.g., via one or more cameras integral with the XR device or sensors in a wearable band) that the user is making a particular gesture with her hand and that the gestures is being performed relative to a QR code, such as by making a C-shape with her hand around the QR code. Based on the detected gesture, the XR device can then read the QR code, and open the content designated by the QR code. Thus, the XR device can scan only the QR code that is intended to be interacted with by the user, as indicated by her gesture relative to the QR code, and can disregard other QR codes that may be in the field-of-view of the XR device.

Although this application discusses QR codes, other codes are contemplated and can be substituted for QR codes in the described embodiments, such as bar codes, URLs, email addresses, addresses, phone numbers, user IDs or handles, metaverse location addresses, etc. In some cases, the action the system takes can depend on the type of code scanned—for example, a scanned email address can open a messaging application with the email address filled in, a phone number can start a call to the indicated number, an address can start a mapping application with the address selected, etc.

Figure 1A:
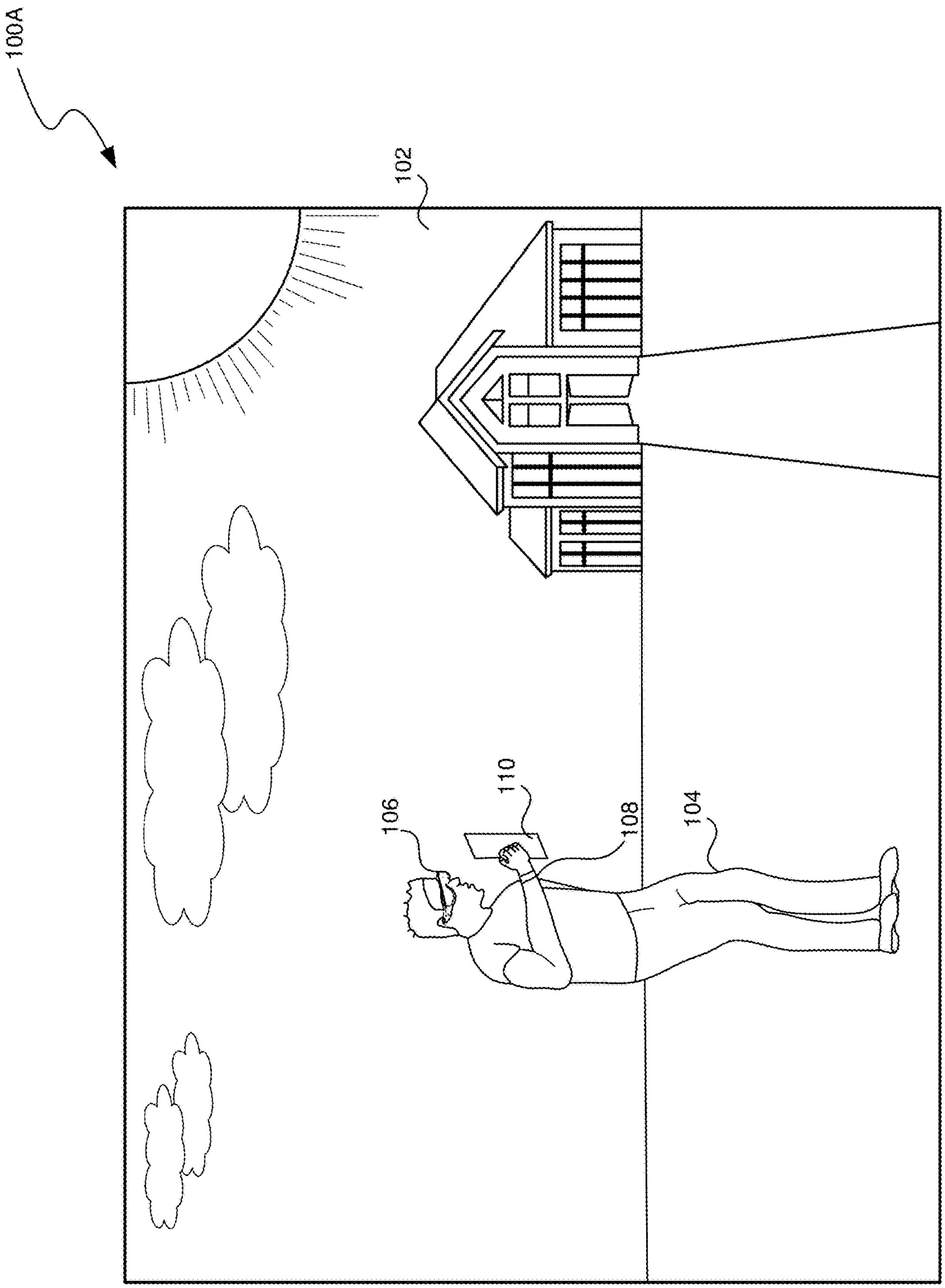
FIG. 1A is a conceptual diagram of an example view of a user raising his wrist to activate an artificial reality device.

FIG. 1A is a conceptual diagram of an example view 100A of a user 104, in real-world environment 102, raising his wrist to activate an artificial reality (XR) device 106. User 104 can hold up a paper 110 having a quick response (QR) code 114 that can be scanned by XR device 106. Smart wristband 108, worn by user 104, can detect user 104 raising his wrist through, for example, one or more sensors of an inertial measurement unit (IMU) (e.g., an accelerometer, a gyroscope, etc.), and/or one or more electromyography (EMG) sensors, as described further herein. In some implementations, smart wristband 108 can transmit an indication to XR device 106 that user 104 has raised his wrist. In response to receiving the indication, XR device 106 can enter into an active mode from a standby mode, and begin to capture images (e.g., through one or more cameras integral with XR device 106).

Figure 1B:
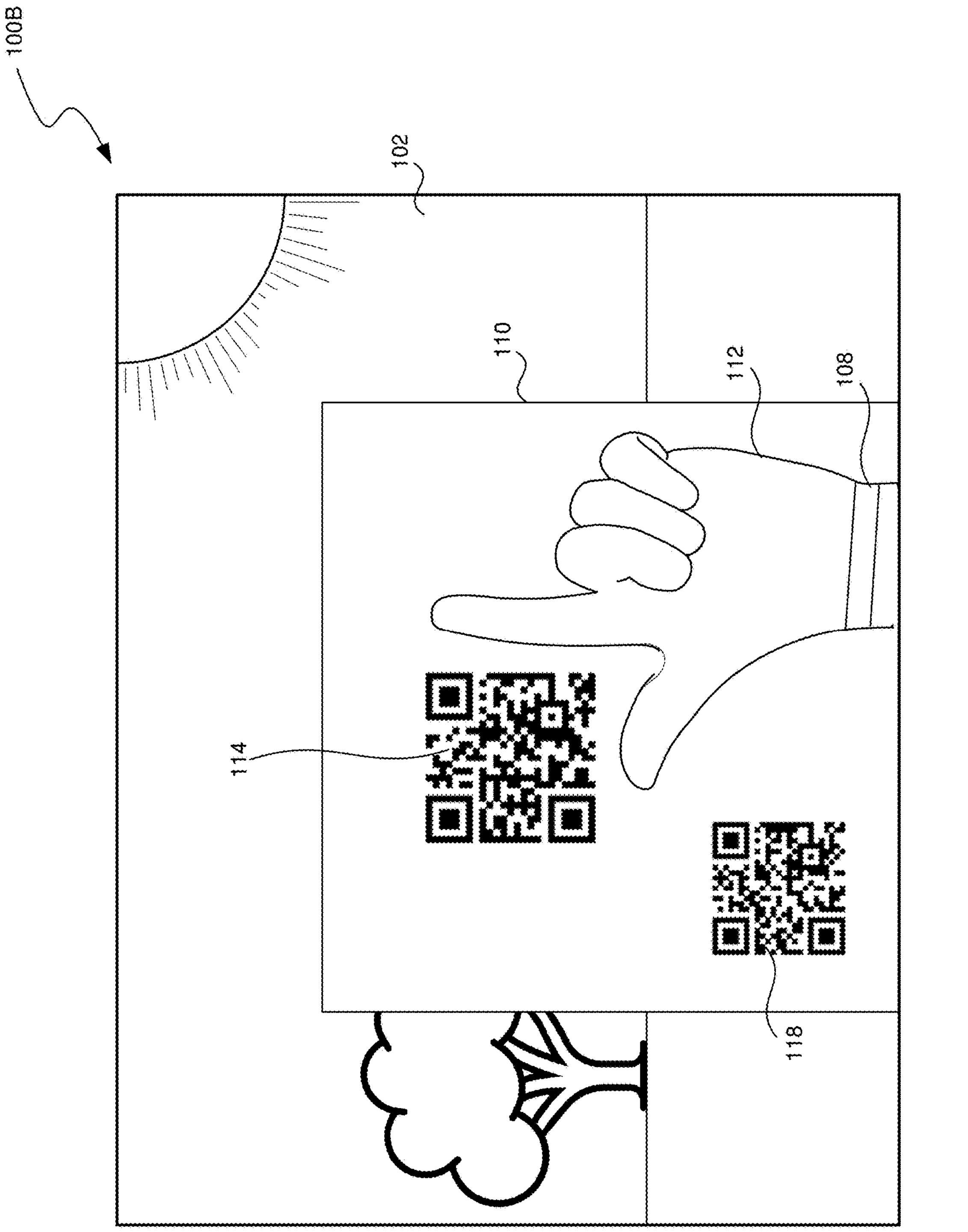
FIG. 1B is conceptual diagram of an example view on an artificial reality device of a user performing an L-shaped gesture with his hand relative to a QR code to scan the QR code with the artificial reality device.

FIG. 1B is conceptual diagram of an example view 100B on an artificial reality (XR) device 106 of a user 104 performing an L-shaped gesture with his hand 112, in real-world environment 102, relative to a quick response (QR) code 114, to scan the QR code 114 with the XR device 106. Once XR device 106 is awakened from a standby mode, XR device 106 can activate its cameras to capture example view 100B. Paper 110 can include QR code 114 that user 104 can desire to scan. Thus, user 104 can use his hand 112 to perform a gesture relative to QR code 114, i.e., an L-shaped gesture, which XR device 106 can, in some implementations, detect by capturing an image of hand 112 and performing object recognition. The L-shaped gesture being performed relative to QR code 114 can, in some implementations, be interpreted by XR device 106 as an instruction to scan QR code 114. XR device 106 can disregard QR code 118 (i.e., not scan QR code 118), which is not indicated by the L-shaped gesture of hand 112.

Figure 1C:
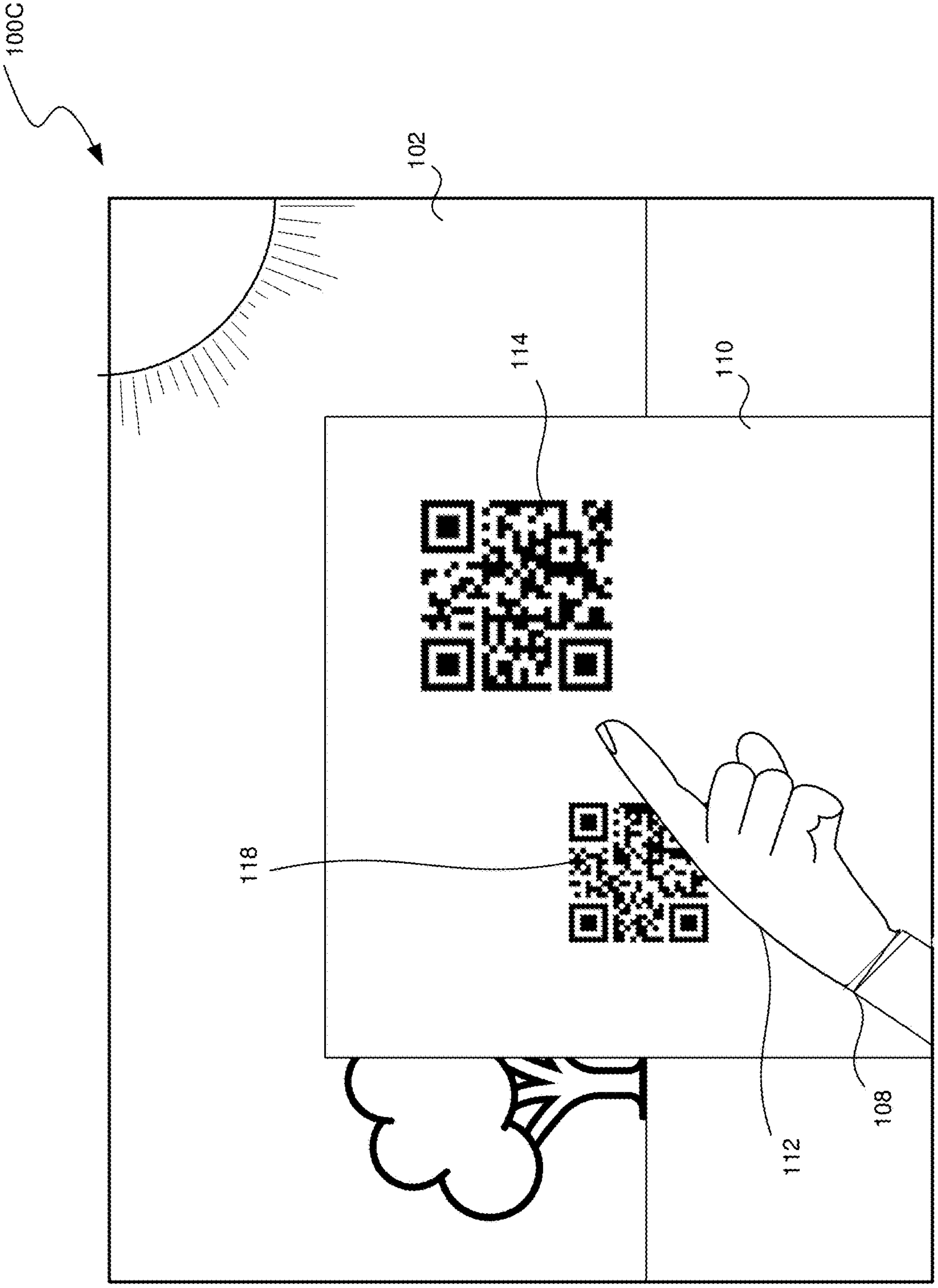
FIG. 1C is a conceptual diagram of an example view on an artificial reality device of a user performing a pointing gesture with his hand relative to a QR code to scan the QR code with the artificial reality device.

FIG. 1C is a conceptual diagram of an example view 100C on an artificial reality (XR) device 106 of a user 104 performing a pointing gesture with his hand 112, in real-world environment 102, relative to a quick response (QR) code 114, to scan the QR code 114 with the XR device 106. Similar to that described with respect to FIG. 1B, user 104 can use his hand 112 to perform a gesture relative to QR code 114, i.e., a pointing gesture, which XR device 106 can, in some implementations, detect by capturing an image of hand 112 and performing object recognition. In this example, the pointing gesture being performed relative to QR code 114 can be interpreted by XR device 106 as an instruction to scan QR code 114. XR device 106 can disregard QR code 118 (i.e., not scan QR code 118), which is not indicated by the pointing gesture of hand 112. Although described herein with respect to FIG. 1B and FIG. 1C as making an L-shaped gesture and pointing gesture, respectively, to cause XR device 106 to scan QR code 114, it is contemplated that any suitable gesture can be recognized by XR device 106 to cause scanning of QR code 114, such as a C- or circle-shaped gesture around QR code 114, a movement of the hand and/or fingers around QR code 114, a tapping gesture on QR code 114, a pinching gesture around QR code 114, etc.

Figure 1D:
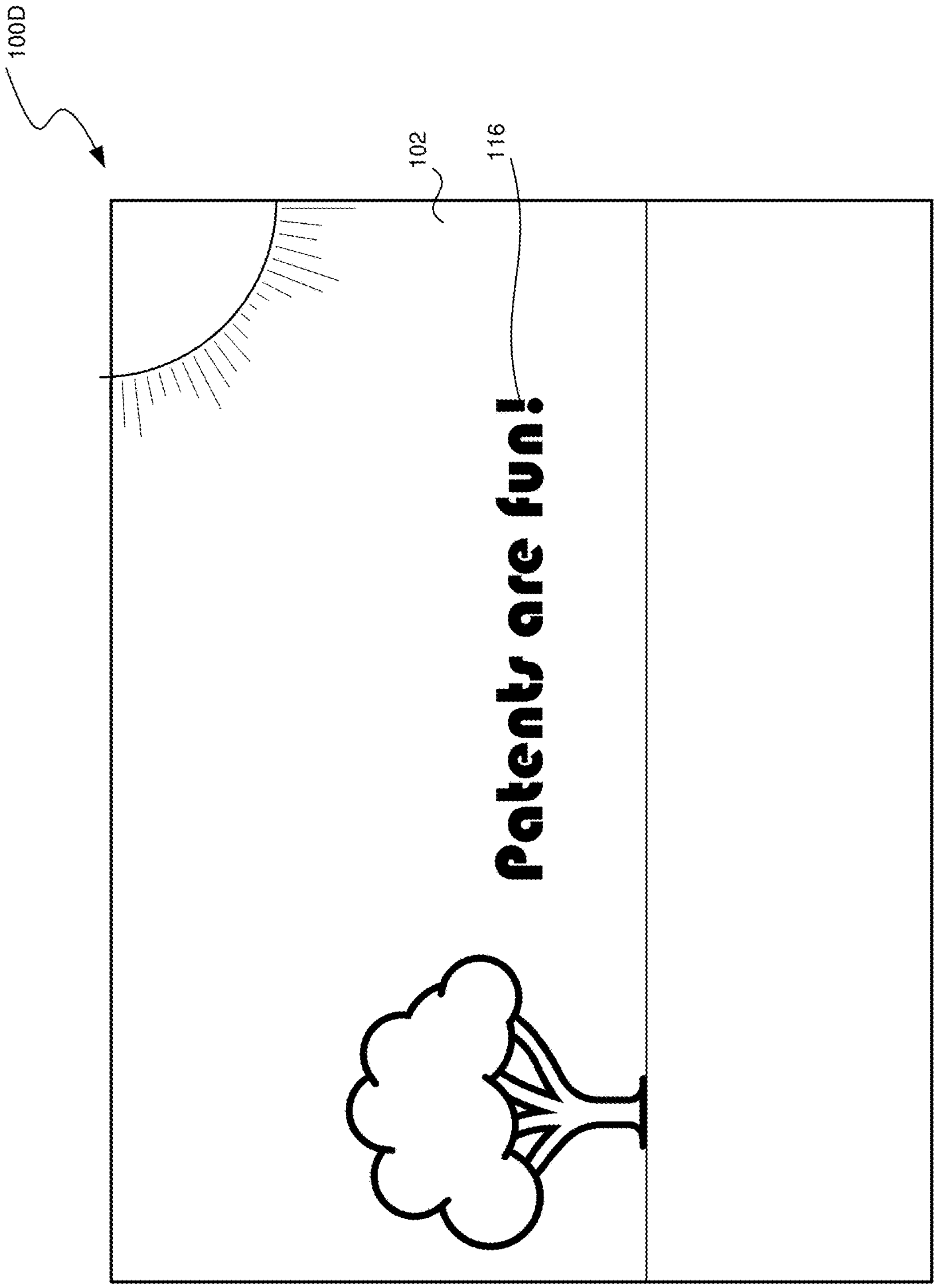
FIG. 1D is a conceptual diagram of an example view on an artificial reality device of content displayed based on scanning of a QR code by the artificial reality device.

FIG. 1D is a conceptual diagram of an example view 100D on an artificial reality (XR) device 106 of content 116 based on scanning of a quick response (QR) code 114 by the XR device 106. From example view 100B and/or example view 100C, XR device 106 can scan and interpret QR code 114, which can be encoded with text in this example (e.g., "Patents are fun!"). Based on the text encoded in QR code 114, XR device 106 can display content 116, which is visually indicating the text encoded in QR code 114. In some implementations, such as in mixed reality (MR) or augmented reality (AR), XR device 106 can display content 116 as an overlay on a view of real-world environment 102.

Figure 2:
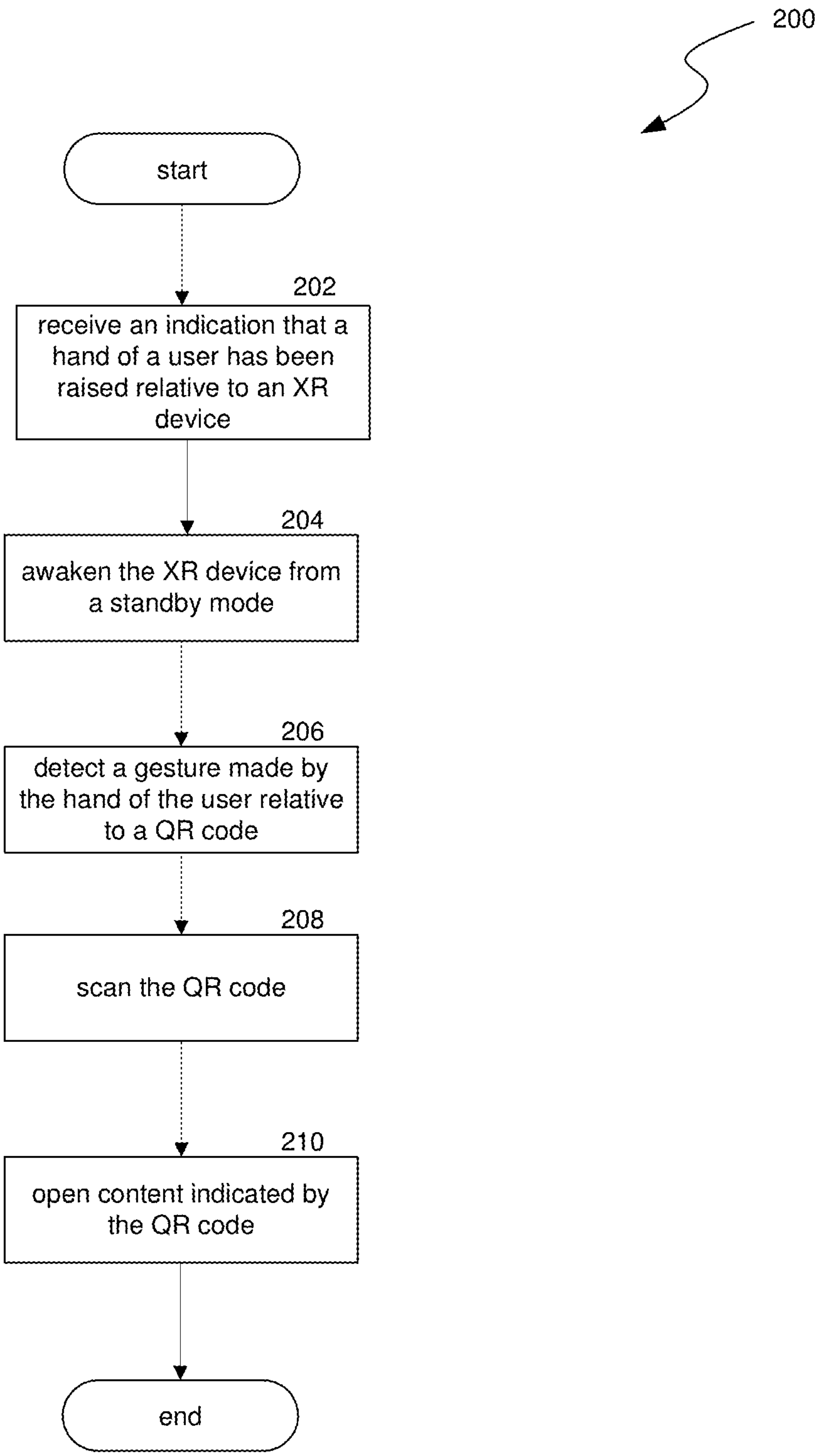
FIG. 2 is a flow diagram illustrating a process used in some implementations for recognizing quick response codes on an artificial reality device.

FIG. 2 is a flow diagram illustrating a process 200 used in some implementations for recognizing quick response (QR) codes on an artificial reality (XR) device. In some implementations, process 200 can be performed as a response to receiving an indication and/or detecting that a hand of a user of the XR device has been raised. In some implementations, process 200 can be partially or fully performed by the XR device, such as an XR head-mounted display (HMD). In some implementations, process 200 can be partially or fully performed by an XR device other than an XR HMD, such as separate processing components.

At block 202, process 200 can receive an indication of a wake command—e.g., that a hand, of a user of the XR device, has been raised relative to the XR device, that a fist has been formed, that some other gesture has been made, that a wake phrase has been spoken, etc. In some implementations, process 200 can receive measurements from one or more sensors of an inertial measurement unit (IMU) integral with or in operable communication with the XR device (e.g., in a smart device, such as a smart wristband or smart ring, or controller in communication with the XR device), to identify and/or confirm one or more motions of the user indicative of the wake command. The measurements may include the non-gravitational acceleration of the device in the x, y, and z directions; the gravitational acceleration of the device in the x, y, and z directions; the yaw, roll, and pitch of the device; the derivatives of these measurements; the gravity difference angle of the device; and the difference in normed gravitational acceleration of the device. In some implementations, the movements of the device may be measured in intervals, e.g., over a period of 5 seconds. For example, when motion data is captured by a gyroscope and/or accelerometer in an IMU of a smart wristband, process 200 (or the smart wristband) can analyze the motion data to identify features or patterns indicative of the wake command, such as the user raising his hand, as trained by a machine learning model. In some implementations, the machine learning model can be trained on stored movements that are known or confirmed to be associated with users raising their hands.

In some implementations, process 200 (or the smart wristband) can receive measurements from one or more electromyography (EMG) sensors integral with or in operable communication with the XR device, such as on an EMG wristband, to identify and/or confirm one or more motions of the user indicative of the wake command. Process 200 can determine that the hand has been put into a particular pose by, for example, analyzing a waveform indicative of electrical activity of one or more muscles of the user using the EMG sensors. Process 200 (or the smart wristband) can analyze the waveform captured by the EMG sensors worn by the user by, for example, identifying features within the waveform and generating a signal vector indicative of the features. In some implementations, process 200 (or the smart wristband) can compare the signal vector to known vectors, indicative of hand raising, stored in a database to identify if any of the known vectors matches the signal vector within a threshold, e.g., is within a threshold distance of a known threshold vector (e.g., the signal vector and a known vector have an angle therebetween that is lower than a threshold angle). If a known vector matches the signal vector within the threshold, process 200 (or the smart wristband) can determine that the user made the wake command.

At block 204, process 200 can awaken the XR device from a standby or "sleep" mode. In some implementations, to conserve battery power, the XR device can remain in a standby mode, while the user traverses his real-world environment, until awakened by the user. For example, the XR device can be awakened based on the user raising her hand, as detected by a wearable device, which can transmit measurements indicative of hand raising and/or an instruction to "wake up" to the XR device. In the standby mode, the camera(s) of the XR device can be disabled.

At block 206, process 200 can detect a gesture made by one or more fingers and/or the hand, of the user of the XR device, relative to a QR code. In some implementations, process 200 can detect the gesture via the wearable device—e.g., using the EMG pose determining features discussed above. In some implementations, process 200 can detect the gesture via one or more cameras integral with or in operable communication with the XR device, such as cameras positioned on an XR HMD pointed away from the user's face, e.g., toward the user's hand(s). For example, process 200 can capture one or more images of the user's hand/or fingers in front of the XR device while making a particular gesture. Process 200 can perform object recognition on the captured image(s) to identify a user's hand and/or fingers making a particular gesture (e.g., an L-shaped gesture, a C-shaped gesture, a two-handed goal post gesture, pointing, etc.).

In some implementations, process 200 can use a machine learning model to identify the gesture from the image(s). For example, process 200 can train a machine learning model with images capturing known gestures, such as images showing a user's finger pointing, a user making a sign with her fingers, etc. Process 200 can identify relevant features in the images, such as edges, curves, and/or colors indicative of fingers, a hand, etc., making a particular gesture. Process 200 can train a machine learning model using these relevant features of known gestures. Once the model is trained with sufficient data, process 200 can use the trained model to identify relevant features in newly captured image(s) and compare them to the features of known gestures. In some implementations, process 200 can use the trained model to assign a match score to the newly captured image(s), e.g., 80%. If the match score is above a threshold, e.g., 70%, process 200 can classify the motion captured by the image(s) as being indicative of a particular gesture. In some implementations, process 200 can further receive feedback from the user regarding whether the identification of the gesture was correct (and/or whether the QR code should have been scanned at block 208 described herein), and update the trained model accordingly. Alternatively or additionally, process 200 can identify and/or confirm the gesture using one or more sensors of an IMU and/or one or more EMG sensors, e.g., on a smart wristband, as described further herein. Process 200 can further determine whether the gesture was made relative to a QR code by, for example, searching the captured image(s) and recognizing a QR code in proximity to the gesture, e.g., within a threshold distance, such as 2 inches.

At block 208, process 200 can, in response to detecting the gesture made by the hand, scan the QR code. Process 200 can scan the QR code using an imaging device, such as a camera, to visually capture the code. Once the QR code is visually captured, process 200 can perform Reed-Solomon error correction, for example, until the image can be interpreted, and data encoded in the QR code can be extracted, At block 210, process 200 can open the content, on the XR device, indicated by the QR code. In other words, once the encoded data has been extracted from the QR code, it can be rendered on the XR device. For example, the QR code can include text and/or an identifier that points to an image, a file, a website, an application, etc. Process 200 can access the text and/or the identifier (e.g., via a web browser), and render such content on the XR device.

Although illustrated herein as process 200 including blocks 202-210, it is contemplated that, in some implementations, it is not necessary to perform blocks 202-204. For example, it is contemplated that the XR device may not be in standby mode when a gesture is made relative to a QR code at block 206. Similarly, it is contemplated that one or more cameras of the XR device may already be active and capable of capturing images of the user's hand and/or the QR code at block 206. In some implementations, therefore, it is contemplated that a wearable device, such as a smart wristband, need not be worn by the user to capture raising of the hand to awaken the XR device.

Aspects of the present disclosure are directed to triggering display of health metrics on an artificial reality (XR) device based on facial recognition. One or more cameras integral with the XR device, facing away from its user, can capture images of the user's face in a mirror. The XR device can perform facial recognition to determine that the face is of the user of the XR device, such as by comparing features of captured facial images to known facial images of the user. The XR device can then add metrics, such as health metrics, around the view of the user's face. For example, a user can look at himself in a full-length mirror, and see his weight, height, activity level, number of steps taken that day, etc. Thus, the user does not have to actively launch an XR experience for displaying the metrics. Further, the ambient display of the metrics can assist in consistent discovery of the information throughout the day, and keep the user motivated to reach health and fitness goals.

Figure 3A:
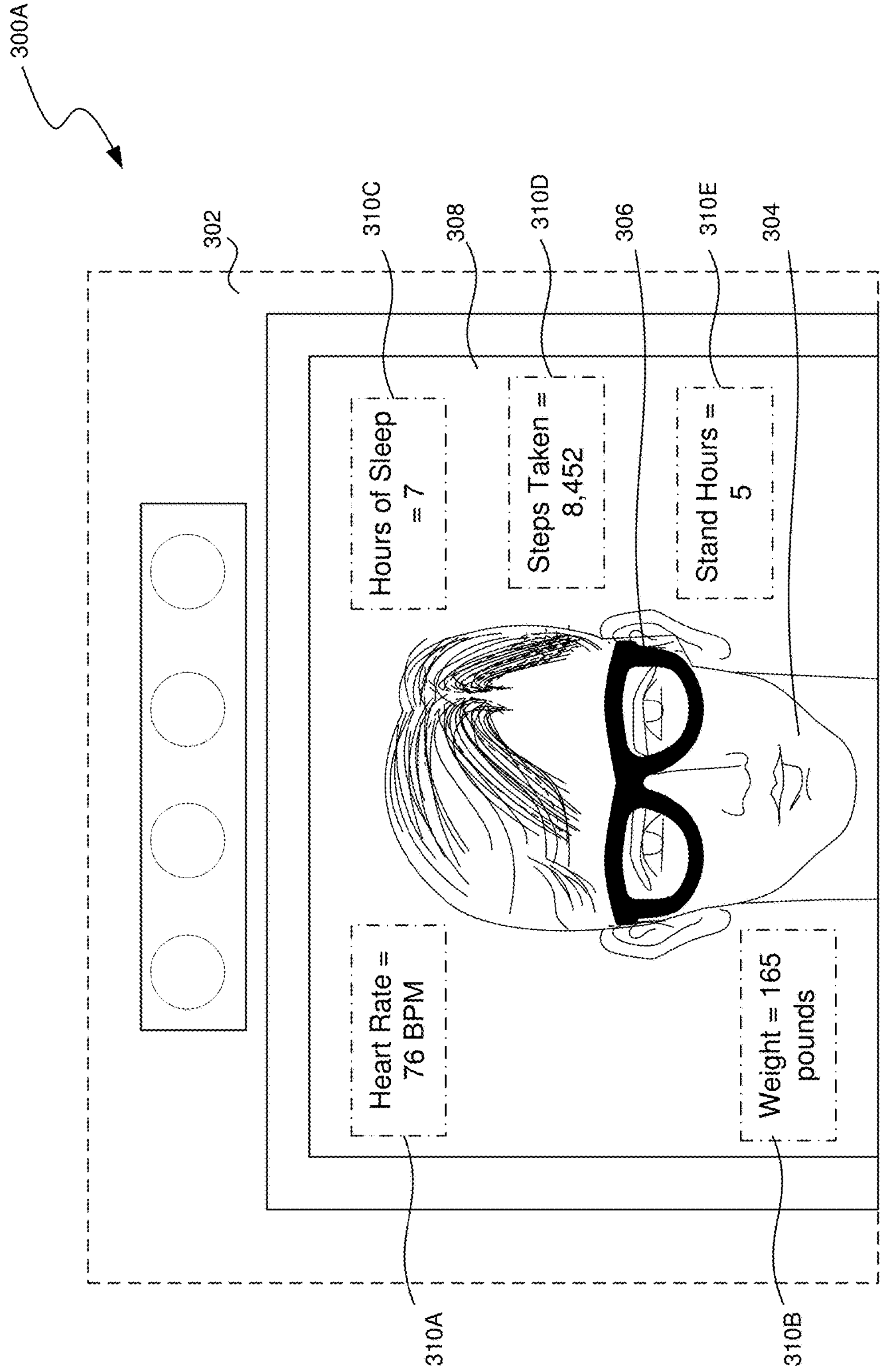
FIG. 3A is a conceptual diagram of an example view on smart glasses, of a user looking in a mirror, with health metrics for the user surrounding his face.

FIG. 3A is a conceptual diagram of an example view 300A on smart glasses 306, of a user looking in a mirror 308, with health metrics 310A-310E for the user surrounding his face 304 in real-world environment image 302. Smart glasses 306 can capture, via one or more outward facing cameras (not shown), one or more images including face 304 of the user of smart glasses 306. In some implementations, smart glasses 306 can perform object detection, object recognition, and/or facial recognition techniques to identify face 304 of the user in particular from the images, or to identify face 304 generally in conjunction with mirror 308, thereby inferring that face 304 is of the particular user. In response to identifying face 304 of the user from image 302, smart glasses 306 can display health metrics 310A-310E associated with the user; for example, metric 310A indicating a heart rate of the user, metric 310B indicating a weight of the user, metric 310C indicating a number of hours of sleep of the user, metric 310D indicating a number of steps taken by the user, and metric 310E indicating a number of hours in the day the user has been standing. Although shown and described relative to particular health metrics 310A-310E, it is contemplated that any of a number of other health metrics or non-health metrics can be displayed on smart glasses 306, examples of which are provided herein.

Figure 3B:
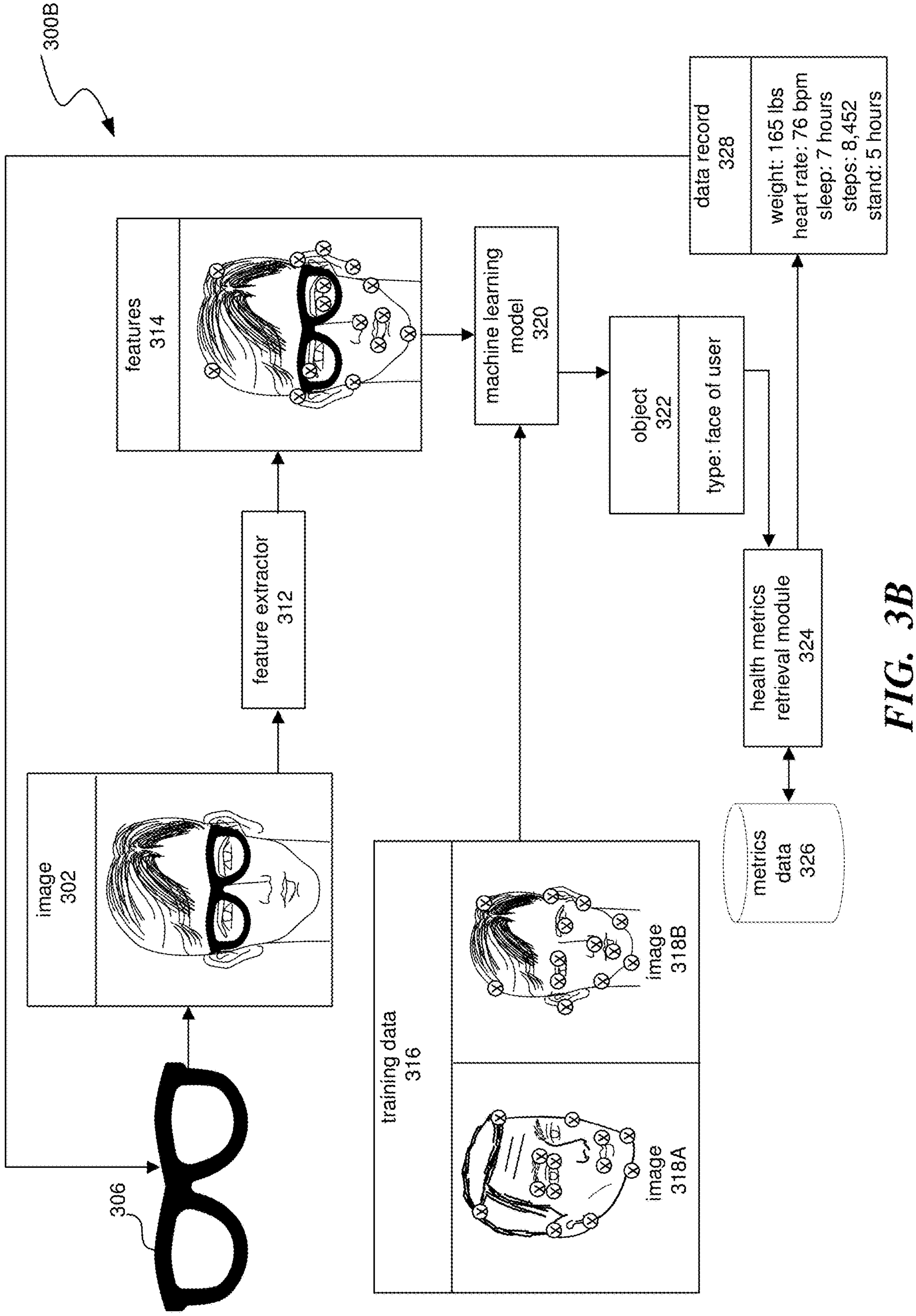
FIG. 3B is conceptual diagram illustrating an exemplary flow for facial recognition and health metrics retrieval by an artificial reality device according to some implementations of the present technology.

FIG. 3B is a conceptual diagram illustrating an exemplary flow 300B for facial recognition and health metrics retrieval by an artificial reality device according to some implementations of the present technology. Smart glasses 306 can capture image 302; in this case, an image of a face of a user of smart glasses 306. Smart glasses 306 can be an XR HMD in some implementations. Image 302 can be fed into feature extractor 312 that can identify relevant features 314 in image 302. Relevant features 314 can correspond to, for example, edges, corners, shapes, curvatures, colors, or textures, or any combination thereof. Relevant features 314 can be fed into machine learning model 320.

Machine learning model 320 can obtain training data 316 including labeled faces of the user with identified features; for example, in image 318A of the user's face and image 318B of the same user's face. Machine learning model 320 can compare relevant features 314 to training data 316 to determine a match score between relevant features 314 and training data 316. In this case, machine learning model 320 can determine that the face in image 302 has a match score above a threshold with training data 316, i.e., is the face of the same user as in images 318A and 318B.

Machine learning model 320 can output data 322 indicating that image 302 is of the face of the user, which can be fed into health metrics retrieval module 324. Health metrics retrieval module 324 can obtain metrics data 326 associated with the user. Health metrics retrieval module 324 can output data record 328 identifying various health metrics, e.g., metrics 310A-310E, to smart glasses 306. Smart glasses 306 can display data record 328, or any derivative thereof, in any suitable means, such as textually or graphically (e.g., as an icon, graph, etc.), alongside statistics and goals, in some implementations. In some implementations, smart glasses 306 can provide feedback to machine learning model 320 regarding whether the face was identified correctly in image 302, such as based on whether the user allows the display of data record 328 to continue (which can imply that the face was correctly identified in some implementations), or to terminate the display of data record 328 (which can imply that the face was incorrectly identified in some implementations).

Figure 4:
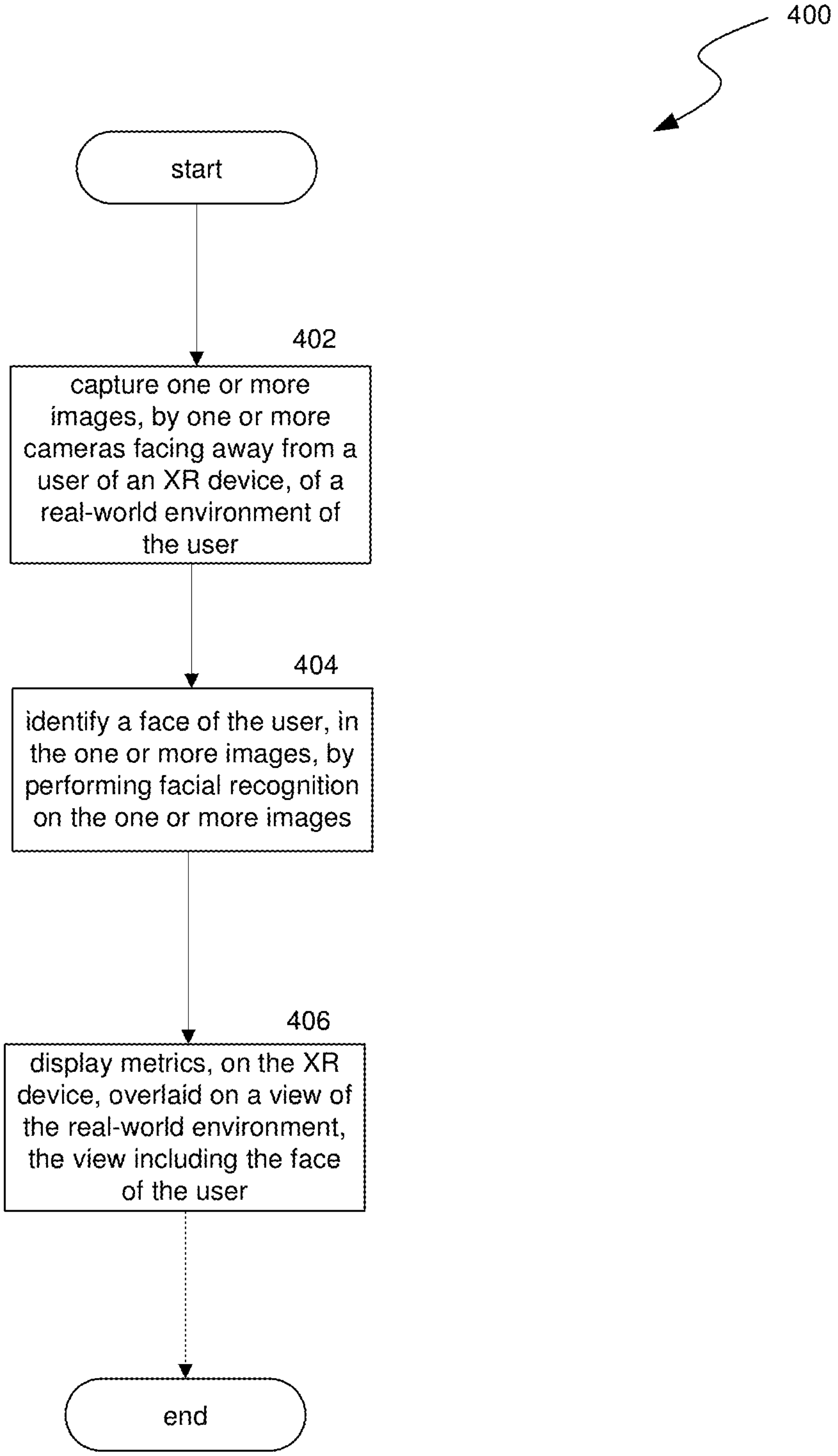
FIG. 4 is a flow diagram illustrating a process used in some implementations for triggering display of metrics for a user on an artificial reality device based on facial recognition.

FIG. 4 is a flow diagram illustrating a process 400 used in some implementations for triggering display of metrics for a user on an artificial reality (XR) device based on facial recognition. In some implementations, process 400 can be performed as a response to activation, donning, or awakening of the XR device. In some implementations, process 400 can be performed as a response to detection of a user of the XR device entering a particular physical space, e.g., a bathroom or other room likely to have a mirror. In some implementations, process 400 can detect that the user of the XR device has entered the particular physical space by capturing and/or accessing one or more spatial anchors and/or one or more guardians (e.g., previously captured and labeled physical boundaries) established for the physical space. In some implementations, process 400 can be performed as a response to a user request to capture images on the XR device. In some implementations, process 400 can be performed by the XR device. In some implementations, some or all of process 400 can be performed by an XR head-mounted display (HMD), XR glasses, and/or XR headset, which are used interchangeably herein. In some implementations, some or all of process 400 can be performed by one or more other XR devices in operable communication with an XR HMD, such as an external camera, external processing components, etc.

At block 402, process 400 can capture one or more images of a real-world environment of the user. In some implementations, the one or more images can be captured by one or more cameras integral with or in operable communication with the XR device. The one or more cameras can include at least one camera facing away from the user of the XR device. In some implementations, the one or more images can be a stream of images, such as a video.

At block 404, process 400 can identify a face of the user, in the one or more captured images, by performing facial recognition on the one or more images. In some implementations, process 400 can perform facial recognition (e.g., object detection and/or recognition) on the face to determine that it is the particular face of the user (as opposed to the face of another user). In some implementations, process 400 can perform facial recognition (e.g., object detection and/or recognition) on the one or more images to determine generally that a face is present in the one or more images, then perform object detection and/or recognition to determine that is a mirror is in front of the XR device, thereby inferring that the face is of the particular user of the XR device. By identifying that a mirror is front of the XR device, process 400 can exclude other reflections of the user's face in some implementations (e.g., a reflection on a window). In some implementations, process 400 can perform facial recognition, object detection, and/or object recognition by comparing known features of faces (or a particular face) to the face captured by the XR device, as described further herein. In some implementations, while performing facial recognition, process 400 can display a virtual object indicating that the face is being scanned, such as by putting a virtual frame or pulsing light around the face. In some implementations, upon positively identifying the face of the user in the captured images, process 400 can delete the captured images from storage.

At block 406, process 400 can, in response to identifying the face of the user, display metrics overlaid on a view of the real-world environment, such as in mixed reality (MR) or augmented reality (AR). The view can include the face, e.g., a reflection of the face in a mirror. In some implementations, process 400 can alternatively or additionally prompt the user to display one or more metrics upon identification of the face of the user. In some implementations, the metrics can be metrics that are individualized for the user. For example, the metrics can include health metrics, e.g., weight, heart rate, blood oxygen level, hours of sleep, number of steps taken, number of stand hours, number of calories consumed, number of calories burned, time spent exercising, scores and/or graphs over time thereof, medication schedules, and/or the like.

In some implementations, process 400 can obtain the metrics via the XR device, e.g., using one or more sensors of an inertial measurement unit (IMU), using one or more cameras integral with or in operable communication with the XR device, etc., in order to track the health-related activities of the user. In some implementations, process 400 can obtain the metrics from a wearable device in operable communication with the XR device, such as a smart wristband or smart watch tracking activity- and health-related metrics. In some implementations, process 400 can obtain the metrics by making application programming interface (API) calls to one or more applications executing on the XR device (or another device in operable communication with the XR device, such as a mobile phone) for activity- and health-related data, such as applications for tracking food intake, counting calories, recording fitness routines, etc.

Although described primarily herein as identifying the face of the user as a trigger to display metrics, it is contemplated, however, that viewing other objects on the XR device can be an alternative trigger. For example, viewing a bed through the XR device can trigger display of sleep metrics. In another example, viewing a car through the XR device can trigger display of traffic and driving metrics. In another example, viewing a television through the XR device can trigger display of viewing metrics by the user, recommended programming, etc.

Although primarily described herein as relating to health metrics, however, it is contemplated that any data and/or information relevant to the user, his environment, or the XR device can be displayed on the XR device based on recognition of the user's face. For example, the XR device can display environmental conditions, such as time of day, date, weather, etc. In another example, the XR device can display metrics related to the XR device, such as available battery power, menus of features or experiences available on the XR device, etc. In some implementations, the metrics displayed on the XR device in response to detecting the user's face can be user customizable.

In some implementations, process 400 can end when the XR device no longer captures images of the user's face, i.e., when the user walks away from a mirror. In some implementations, process 400 can end after a predefined period of time, e.g., 1 minute. In some implementations, process 400 can end when the user removes or deactivates the XR device, or places it in a low-powered sleep or standby mode in which the cameras and/or the display are no longer executing.

Figure 5:
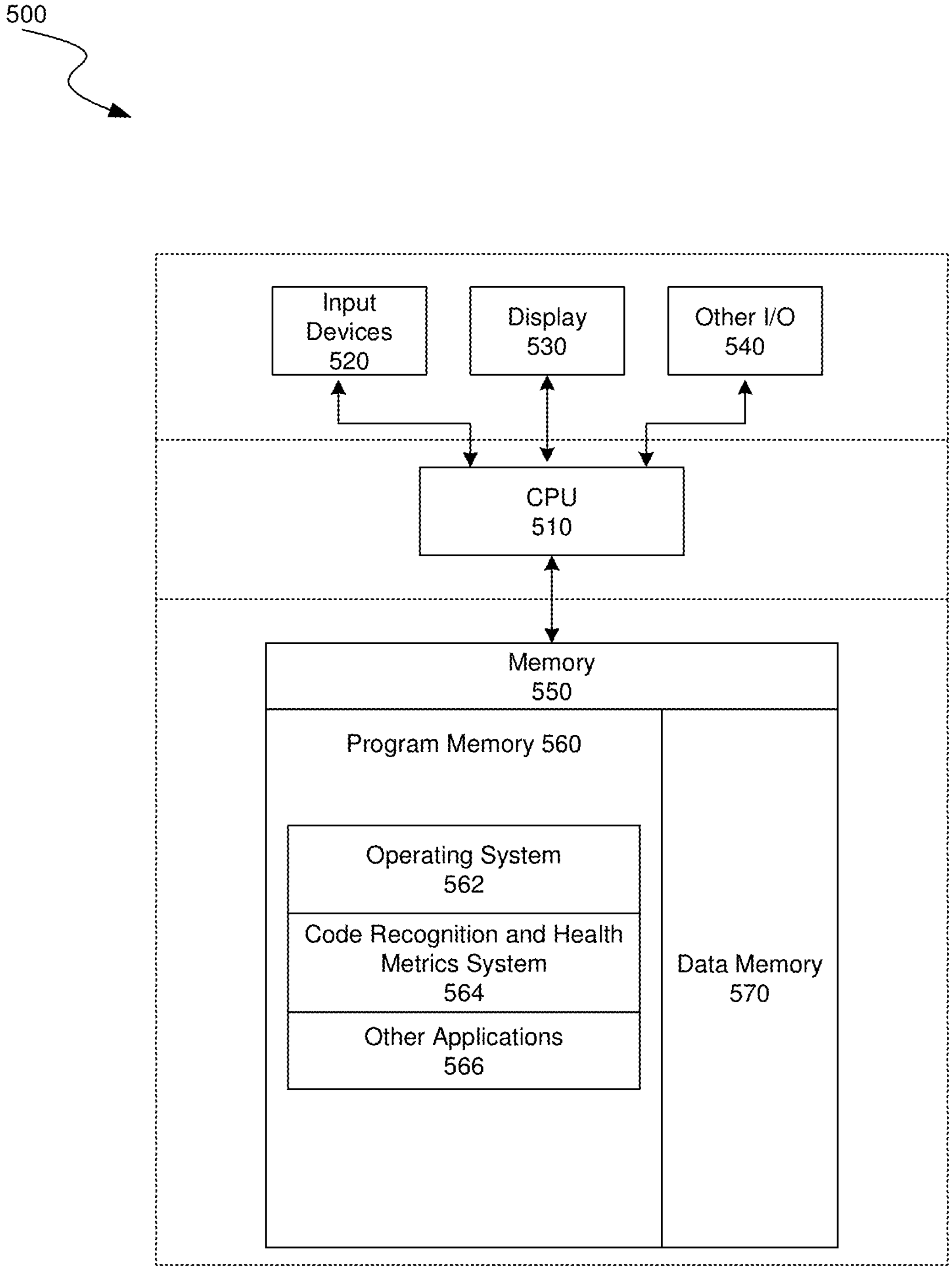
FIG. 5 is a block diagram illustrating an overview of devices on which some implementations of the present technology can operate.

FIG. 5 is a block diagram illustrating an overview of devices on which some implementations of the disclosed technology can operate. The devices can comprise hardware components of a device 500 as shown and described herein. Device 500 can include one or more input devices 520 that provide input to the Processor(s) 510 (e.g., CPU(s), GPU(s), HPU(s), etc.), notifying it of actions. The actions can be mediated by a hardware controller that interprets the signals received from the input device and communicates the information to the processors 510 using a communication protocol. Input devices 520 include, for example, a mouse, a keyboard, a touchscreen, an infrared sensor, a touchpad, a wearable input device, a camera- or image-based input device, a microphone, or other user input devices.

Processors 510 can be a single processing unit or multiple processing units in a device or distributed across multiple devices. Processors 510 can be coupled to other hardware devices, for example, with the use of a bus, such as a PCI bus or SCSI bus. The processors 510 can communicate with a hardware controller for devices, such as for a display 530. Display 530 can be used to display text and graphics. In some implementations, display 530 provides graphical and textual visual feedback to a user. In some implementations, display 530 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 540 can also be coupled to the processor, such as a network card, video card, audio card, USB, firewire or other external device, camera, printer, speakers, CD-ROM drive, DVD drive, disk drive, or Blu-Ray device.

In some implementations, the device 500 also includes a communication device capable of communicating wirelessly or wire-based with a network node. The communication device can communicate with another device or a server through a network using, for example, TCP/IP protocols. Device 500 can utilize the communication device to distribute operations across multiple network devices.

The processors 510 can have access to a memory 550 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 550 can include program memory 560 that stores programs and software, such as an operating system 562, Code Recognition and Health Metrics System 564, and other application programs 566. Memory 550 can also include data memory 570, which can be provided to the program memory 560 or any element of the device 500.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 6:
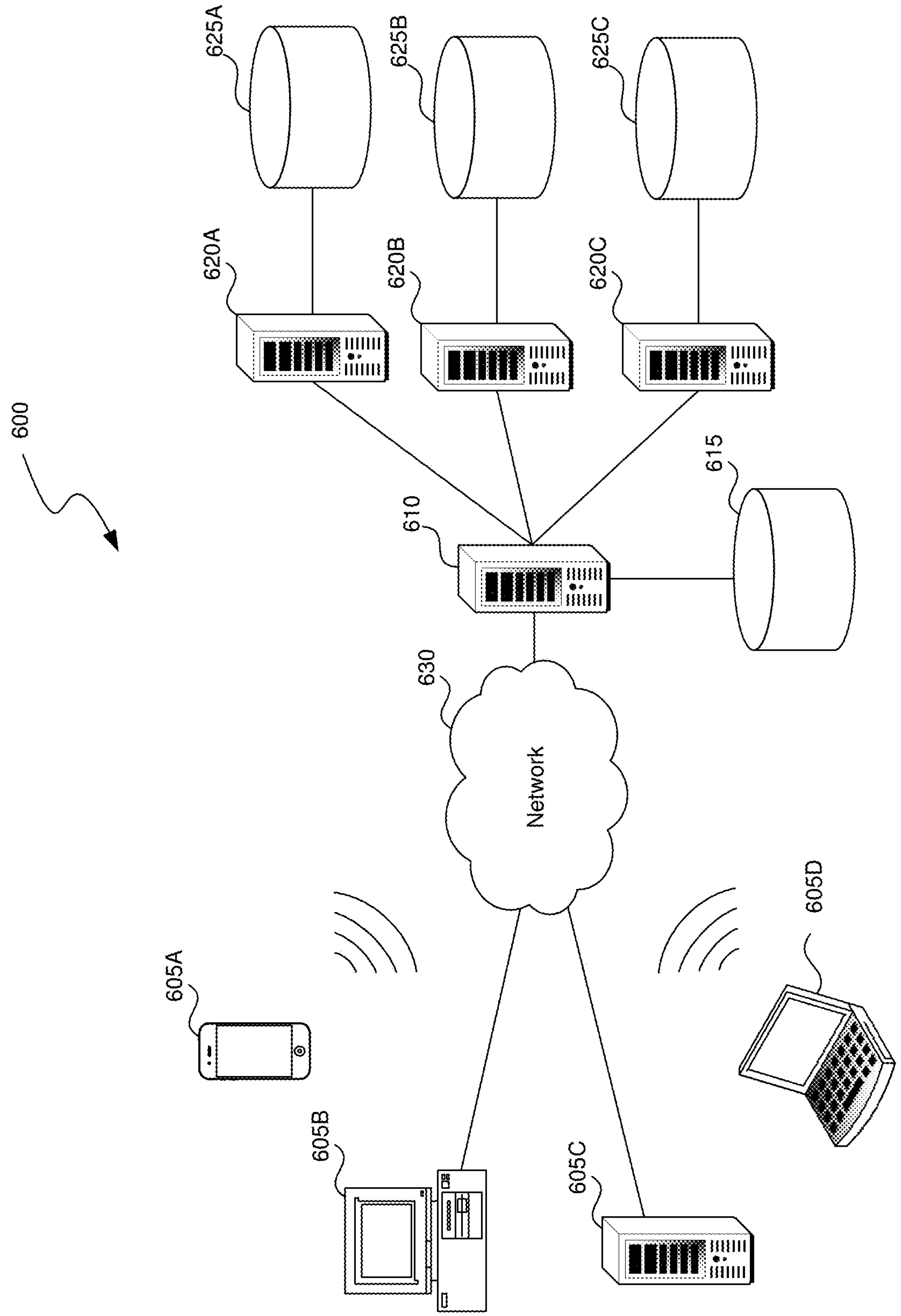
FIG. 6 is a block diagram illustrating an overview of an environment in which some implementations of the present technology can operate.

FIG. 6 is a block diagram illustrating an overview of an environment 600 in which some implementations of the disclosed technology can operate. Environment 600 can include one or more client computing devices 605A-D, examples of which can include device 500. Client computing devices 605 can operate in a networked environment using logical connections through network 630 to one or more remote computers, such as a server computing device.

In some implementations, server 610 can be an edge server which receives client requests and coordinates fulfillment of those requests through other servers, such as servers 620A-C. Server computing devices 610 and 620 can comprise computing systems, such as device 500. Though each server computing device 610 and 620 is displayed logically as a single server, server computing devices can each be a distributed computing environment encompassing multiple computing devices located at the same or at geographically disparate physical locations. In some implementations, each server 620 corresponds to a group of servers.

Client computing devices 605 and server computing devices 610 and 620 can each act as a server or client to other server/client devices. Server 610 can connect to a database 615. Servers 620A-C can each connect to a corresponding database 625A-C. As discussed above, each server 620 can correspond to a group of servers, and each of these servers can share a database or can have their own database. Databases 615 and 625 can warehouse (e.g., store) information. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. Network 630 may be the Internet or some other public or private network. Client computing devices 605 can be connected to network 630 through a network interface, such as by wired or wireless communication. While the connections between server 610 and servers 620 are shown as separate connections, these connections can be any kind of local, wide area, wired, or wireless network, including network 630 or a separate public or private network.

In some implementations, servers 610 and 620 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g., indicia provided from a client device such as emotion indicators, status text snippets, location indictors, etc.), or other mufti-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (e.g., via their personalized avatar) with objects or other avatars in an artificial reality environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide an artificial reality environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof. Additional details on XR systems with which the disclosed technology can be used are provided in U.S. patent application Ser. No. 17/170,839, titled "INTEGRATING ARTIFICIAL REALITY AND OTHER COMPUTING DEVICES," filed Feb. 8, 2021 and now issued as U.S. Pat. No. 11,402,964 on Aug. 2, 2022, which is herein incorporated by reference.

Those skilled in the art will appreciate that the components and blocks illustrated above may be altered in a variety of ways. For example, the order of the logic may be rearranged, substeps may be performed in parallel, illustrated logic may be omitted, other logic may be included, etc. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for recognizing, by an artificial reality (XR) system, information encoded in an image presented on a physical object, the method comprising:

detecting a first gesture performed by a user of the XR system, the first gesture including a hand being raised above a threshold;

in response to detecting that the user has performed the first gesture, i) awakening the XR system from a standby mode and ii) enabling at least an image capture component of the XR system;

detecting a second gesture performed by the user of the XR system;

in accordance with a determination that the second gesture is positioned, from the user's point of view, relative to encoded information included in a portion of an image, scanning the portion of the image to extract the encoded information; and opening content, on the XR system, indicated by the encoded information.

2. The method of claim 1, wherein the encoded information included is in the portion of the image is a Quick Response (QR) code.

3. The method of claim 1, wherein the encoded information included in the portion of the image is one or more of a bar code and a universal resource locator (URL).

4. The method of claim 1, wherein the detecting the first gesture performed by the user of the XR system is based on measurements from one or more inertial measurement units (IMU) included in a hand or wrist wearable device or a handheld device.

5. The method of claim 1, wherein the detecting the first gesture performed by the user of the XR system is based on an analysis, by a machine learning model, of measurements taken at pre-defined intervals corresponding to a determined timeframe that reduces power consumption by requiring the user hold the first gesture for a time relative to the timeframe.

6. The method of claim 1, wherein the detecting the first gesture performed by the user of the XR system is based on one or more of:

detecting a first pre-defined gesture in one or more images;

detecting a second pre-defined gesture based on readings from an electromyography (EMG) device attached to the user's wrist or hand; and detecting that a wake phrase has been spoken in recorded audio, or any combination thereof.

7. The method of claim 1, wherein the detecting the second gesture is performed using images captured by the image capture component of the XR system and/or using readings from one or more sensors of an electromyography (EMG) device.

8. The method of claim 1, wherein the second gesture is one or both of the user's hands having the user's index finger extended and the user's thumb extended while the user's remaining three fingers are curled in towards the user's palm in an L-gesture or a goal-post shaped gesture and wherein the determining that the second gesture is positioned, from the user's point of view, relative to the encoded information included in the portion of the image includes determining that, from the user's point of view, the encoded information is at least partially above one or both of the user's thumbs and to the left or right of one or both of the user's index fingers;

wherein the second gesture is one of the user's hands having the user's index finger extended while the user's remaining three fingers and thumb are curled in towards the user's palm in a pointing gesture, and wherein the determining that the second gesture is positioned, from the user's point of view, relative to the encoded information included in the portion of the image includes determining that, from the user's point of view, the line that would extend along the index finger intersects with the encoded information;

wherein the second gesture is one of the user's hands having a distal end of a user's finger touching a distal end of the user's thumb in a pinching gesture, and wherein the determining that the second gesture is positioned, from the user's point of view, relative to the encoded information included in the portion of the image includes determining that, from the user's point of view, a line that would extend from the user's point of view through the point where the distal end of the user's finger touches the distal end of the user's thumb intersects with the encoding of the encoded information; or wherein the second gesture is one of the user's hands having an index finger in motion performing a taping gesture, and wherein the determining that the second gesture is positioned, from the user's point of view, relative to the encoded information included in the portion of the image includes determining that, from the user's point of view, a line that would extend from the user's point of view through a distal end of the user's index finger intersects with the encoded information.

9. The method of claim 1, wherein the scanning the portion of the image to extract the encoded information includes performing Reed-Solomon error correction until the image can be interpreted.

10. The method of claim 1, wherein the encoded information includes natural language with text as the content and/or an identifier that points to the content as an image, a file, a website, or an application; and wherein the opening content including the XR system providing the content as an overlay on a view of real-world environment.

11. A computing system for recognizing, by an artificial reality (XR) system, information encoded in an image presented on a physical object, the computing system comprising:

one or more processors; and one or more memories storing instructions that, when executed by the one or more processors, cause the computing system to:

detect a first gesture performed by a user of the XR system, the first gesture including a hand being raised above a threshold;

in response to detecting that a user has performed a first gesture, i) awake the XR system from a standby mode and ii) enable at least an image capture component of the XR system;

detect a second gesture performed by the user of the XR system; and in accordance with a determination that the second gesture is positioned, from the user's point of view, relative to encoded information included in a portion of an image, scan the portion of the image to extract the encoded information.

12. The computing system of claim 11, wherein the instructions, when executed, further cause the computing system to open content, on the XR system, indicated by the encoded information.

13. The computing system of claim 12, wherein the opening the content is performed by determining a type of the content and performing an action mapped to the determined type of the content.

14. The computing system of claim 12, wherein the encoded information includes natural language with text as the content and/or an identifier that points to the content as an image, a file, a website, or an application; and wherein the opening content including the XR system providing the content as an overlay on a view of real-world environment.

15. The computing system of claim 11, wherein the detecting the first gesture performed by the user of the XR system includes both determining that the user has raised the user's hand above a threshold and has used the raised hand to perform a pre-determined wake gesture.

16. The computing system of claim 11, wherein the encoded information included in the portion of the image is a Quick Response (QR) code.

17. The computing system of claim 11, wherein the detecting the first gesture performed by the user of the XR system is based on one or more of:

detecting a first pre-defined gesture in one or more images, detecting a second pre-defined gesture based on readings from an electromyography (EMG) device attached to the user's wrist or hand, detecting that a wake phrase has been spoken in recorded audio, or any combination thereof.

18. A computer-readable storage medium storing instructions, for recognizing, by an artificial reality (XR) system, information encoded in an image presented on a physical object, the instructions, when executed by a computing system, cause the computing system to:

detect a second gesture performed by a user of the XR system;

in accordance with a determination that the second gesture is positioned, from the user's point of view, relative to encoded information included in a portion of an image, scan the portion of the image to extract the encoded information; and open content, on the XR system, indicated by the encoded information.

19. The computer-readable storage medium of claim 18, wherein the instructions, when executed by the computing system, further cause the computing system to:

detect a first gesture performed by the user; and in response to detecting that the user has performed the first gesture, i) awake the XR system from a standby mode and ii) enabling at least an image capture component of the XR system.

20. The computer-readable storage medium of claim 18, wherein the second gesture is one of the user's hands having the user's index finger extended and the user's thumb extended while the user's remaining three fingers are curled in towards the user's palm in an L-shaped gesture and wherein the determining that the second gesture is positioned, from the user's point of view, relative to the encoded information included in the portion of the image includes determining that, from the user's point of view, the encoding of the information is at least partially above the user's thumb and to the left or right of the user's index finger;

wherein the second gesture is one of the user's hands having a distal end of a user's finger touching a distal end of the user's thumb in a pinching gesture, and wherein the determining that the second gesture is positioned, from the user's point of view, relative to the encoded information included in the portion of the image includes determining that, from the user's point of view, a line that would extend from the user's point of view through the point where the distal end of the user's finger touches the distal end of the user's thumb intersects with the encoded information; or wherein the second gesture is one of the user's hands having an index finger in motion performing a taping gesture, and wherein the determining that the second gesture is positioned, from the user's point of view, relative to the encoded information included in the portion of the image includes determining that, from the user's point of view, a line that would extend from the user's point of view through a distal end of the user's index finger intersects with the encoded information.

* * * * *